United States Patent
Osborne

(10) Patent No.: US 10,370,298 B2
(45) Date of Patent: *Aug. 6, 2019

(54) TARGET TILES FOR AN AUTOTHERMAL REFORMATION/SECONDARY REFORMATION UNIT

(71) Applicant: Brian K. Osborne, Saint Louis, MO (US)

(72) Inventor: Brian K. Osborne, Saint Louis, MO (US)

(73) Assignee: O'Brien Asset Management, LLC, Saint Louis, MO (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/696,601

(22) Filed: Sep. 6, 2017

(65) Prior Publication Data

US 2018/0290931 A1   Oct. 11, 2018

Related U.S. Application Data

(60) Provisional application No. 62/483,507, filed on Apr. 10, 2017.

(51) Int. Cl.
| | |
|---|---|
| *C04B 35/48* | (2006.01) |
| *C01B 3/38* | (2006.01) |
| *B01J 8/02* | (2006.01) |
| *B01J 19/02* | (2006.01) |
| *C01B 3/40* | (2006.01) |
| *B01J 19/30* | (2006.01) |
| *B01J 8/04* | (2006.01) |

(52) U.S. Cl.
CPC ............ *C04B 35/48* (2013.01); *B01J 8/025* (2013.01); *B01J 8/0278* (2013.01); *B01J 8/0453* (2013.01); *B01J 19/02* (2013.01); *B01J 19/30* (2013.01); *C01B 3/38* (2013.01); *C01B 3/382* (2013.01); *C01B 3/386* (2013.01); *C01B 3/40* (2013.01); *B01J 2208/00504* (2013.01); *B01J 2208/00884* (2013.01); *B01J 2208/025* (2013.01); *B01J 2219/0263* (2013.01); *B01J 2219/30207* (2013.01); *B01J 2219/30416* (2013.01); *C01B 2203/0244* (2013.01); *C01B 2203/0261* (2013.01); *C01B 2203/0816* (2013.01); *C01B 2203/1005* (2013.01); *C01B 2203/1082* (2013.01); *C01B 2203/1241* (2013.01); *C04B 2235/3225* (2013.01); *C04B 2235/3246* (2013.01); *C04B 2235/94* (2013.01); *Y02P 20/52* (2015.11)

(58) Field of Classification Search
CPC ...................................................... C04B 35/48
See application file for complete search history.

(56) References Cited

U.S. PATENT DOCUMENTS

| | | | | |
|---|---|---|---|---|
| 6,420,063 B1 * | 7/2002 | Ozin | ....................... | C01G 25/00 429/488 |
| 7,514,387 B2 * | 4/2009 | LaBarge | ................ | B01J 8/0221 422/198 |

* cited by examiner

*Primary Examiner* — Stuart L Hendrickson
(74) *Attorney, Agent, or Firm* — C. John Brannon; Brannon Sowers & Cracraft PC

(57) ABSTRACT

A corrosion resistant refractory ceramic hexagonal target tile body for use covering a catalyst, including a generally flat hexagonal portion and a plurality of generally right circular cylindrical aperture portions extending therethrough, wherein the hexagonal tile body has a thickness of about 89 mm and a width of about 42 cm and is 13 percent yttria fully stabilized YSZ. Each respective aperture has a diameter of about 19 mm.

10 Claims, 3 Drawing Sheets

TARGET TILES FOR AN AUTOTHERMAL REFORMATION/SECONDARY REFORMATION UNIT

CROSS-REFERENCE TO RELATED APPLICATIONS

This patent application claims priority to U.S. provisional patent application Ser. No. 62/483,507, filed on Apr. 10, 2017.

TECHNICAL FIELD

The claimed technology relates generally to ceramic materials and, more particularly, to refractory tile for emplacement between a hot gas source and catalyst media for synthesis gas production during secondary reformation (SR) and/or autothermal reformation (ATR).

BACKGROUND

Commercial ATR and/or SR units often combust air or oxygen with pre-reformed natural gas and steam or combusting air or oxygen with residual methane, such as from a tubular reformer, through a bed of refractory media as part of their operational design. For example, SR or ATR units are commonly used for production of synthesis gas for producing ammonia, methanol, and the like. Such gas-to-liquid systems direct hot gasses over a catalyst bed to convert hydrocarbons into synthesis gas. However, thermal and/or catalyst media are subject to corrosion and degradation from the combined temperature and chemical reactivity of the hot gasses flowing thereover. In many furnace designs, tile barriers are provided to intercede between rapidly flowing hot gas from the combustion zone and the catalyst media beds, to slow and distribute hot gas flow evenly and both protect the catalyst from direct gas exposure and to help hold the catalyst in position. However, these refractory bodies are likewise directly exposed to hot corrosive gasses.

Another problem with commercial ATR/SR burner design is that alumina vapor generated at the hot gas/catalyst media interface cools as it travels through the catalyst and/or downstream refractory media heat exchanger beds, depositing fine alumina powder coatings thereupon. This alumina powder deposition contributes to ruby formation in the catalyst bed, reducing catalyst efficiency; bed cloggage in general, reducing gas flow-through efficiency; and/or deposition on waste heat media and/or boiler tubes after exiting the ATR/SR that reduces the efficiency of the waste heat reclamation system. All of these factors contribute to efficiency reduction and the more frequent need for shutdown of the system for maintenance, which is costly both in and of itself and in the loss of productivity during the down time.

Thus, there is a need for refractory media for intercession between the burner and the catalyst media that is easily replaced and resistant to both thermal shock and chemical corrosion. The present novel technology addresses this need.

DESCRIPTION OF THE PREFERRED EMBODIMENTS

Figure 1:
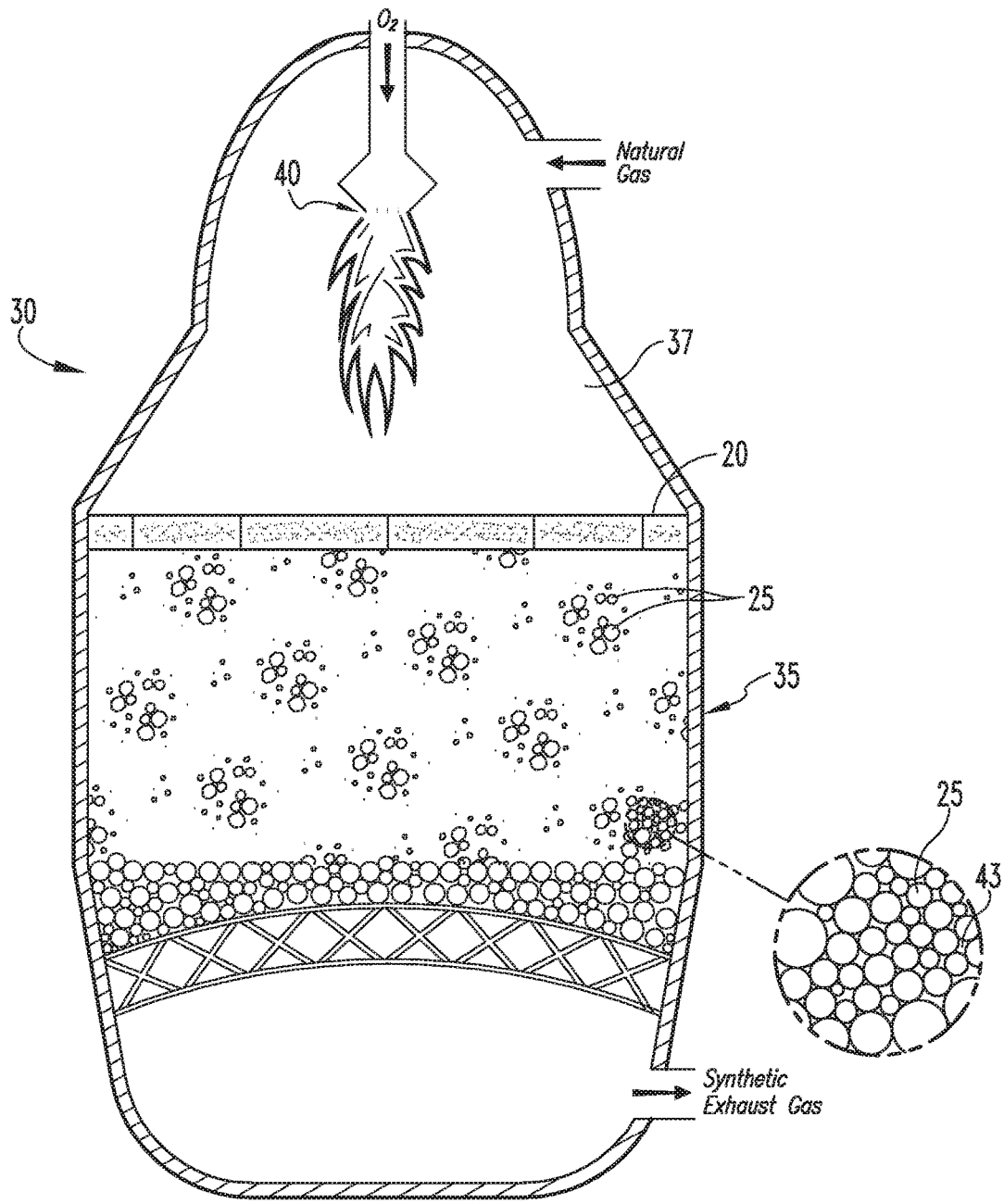
FIG. 1 is a schematic view of a first embodiment gas reformation burner system incorporating the hexagonal refractory target tiles of the present novel technology.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2:
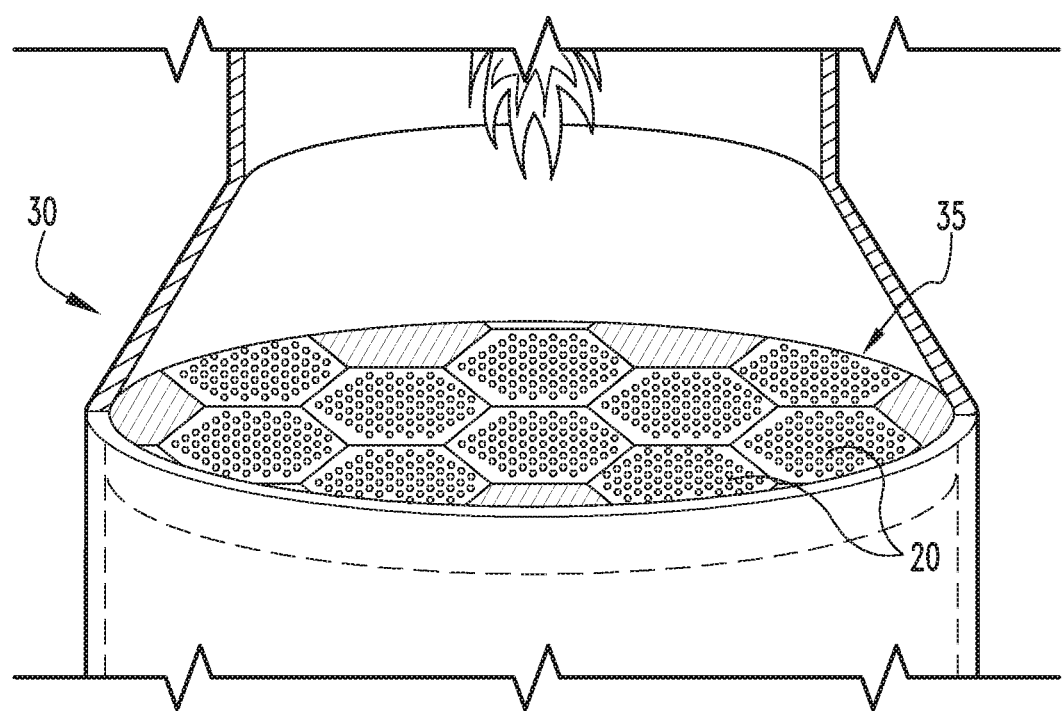
FIG. 2 is a partial perspective cutaway view of the side elevation view of FIG. 1.
Figure 3:
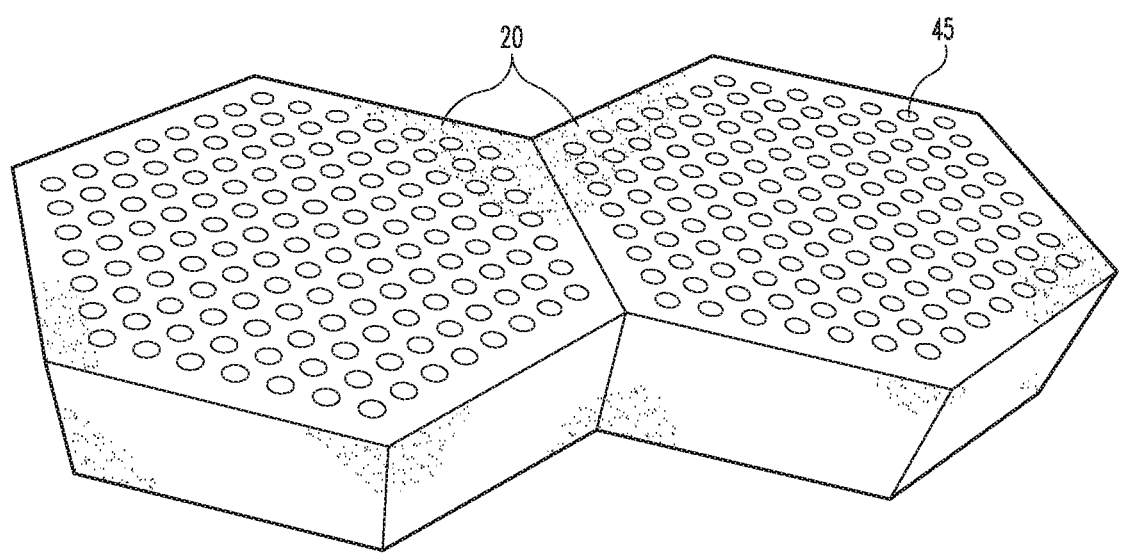
FIG. 3 is a perspective view of two adjacent hexagonal tiles of the present novel technology.

As shown in FIGS. 1-3, the novel technology described and claimed herein relates to generally hexagonal, typically yttria stabilized zirconia (YSZ) or alumina, refractory tiles 20 for use covering catalytic bed media 25 in SR and/or ATR systems 30. In general, the invention relates to SR or ATR-systems 30 having a media bed 35 design wherein the hot combustion gas from the currently active burner 40 is directed onto catalyst media 25 for catalysis of the active component of the gasses. The system 30 typically includes a plurality of catalyst media 25 defining a bed 35 to afford increased surface area for catalyzing chemical reactions in the hot gas passing through from the combustion chamber portion 37 of the burner system 30 to yield a synthesis gas.

Catalyst media bodies 25 are typically pellet or cog shaped, but may include any convenient shape. Typically, catalyst media bodies 25 are between about 13 and 25 mm in diameter. The catalyst bodies 25 are typically formed from a high alumina precursor, typically 95-99 weight percent alumina, and sometimes as much as 99.9 weight percent alumina or more, with the remainder being between about 0.1 and about 0.5 weight percent silica, iron oxide, titania, calcia and soda, although other compositions may be selected. The catalyst media bodies 25 are essentially refractory bodies, typically high alumina or calcium aluminate, that have been coated or impregnated with nickel or a like catalyst material. The catalyst bodies 25 may be solid or they may be perforated with one or more apertures 45 for regulating gas flow therethrough.

The tile bodies 20 are typically hexagonally shaped, although they may take other convenient shapes. The hexagonal tiles 20 may be solid or they may be perforated (or honeycombed) with apertures 45 for regulating gas flow therethrough. The tile bodies 20 are typically about forty-two (42) cm across and about eighty-nine (89) mm thick. The apertures 45 are typically shaped as right circular cylinders and are more typically about nineteen (19) mm in diameter, and are more typically evenly distributed across all or part of the tile 20. The YSZ tiles may be fully or partially stabilized. One typical composition is thirteen percent (13%) yttria.

The target bodies 20 are typically yttria stabilized zirconia. The YSZ bodies are typically fully stabilized. The target bodies are fully stabilized, and typically contain between 6% and 20% yttria, more typically contain between about 8% and about 20% yttria, still more typically between 12% and 16% yttria, and small amounts (typically 1%-3%) alumina, with the balance being zirconia with trace amounts of other metal oxides. One typical composition is thirteen percent (13%) YSZ, with the balance being alumina, as given in the table below:

| Chemistry | WT % |
|---|---|
| $Al_2O_3$ | 2.76 |
| $Na_2O$ | 0.01 |
| $SiO_2$ | 0.08 |
| CaO | 0.75 |
| $Fe_2O_3$ | 0.07 |
| $TiO_2$ | 0.20 |
| $Zr_2O$ | 82.04 |
| MgO | 0.01 |
| $K_2O$ | 0.01 |
| Yttria | 13.03 |
| Other | 1.05 |
| Total | 100.00 |
| $Zr_2O + Y_2O_3$ | 95.07 |

The target tiles 20 are typically sintered to achieve density and desired microstructural characteristics, and more typically exhibit a porosity of about five (5) percent or less, more typically less than three (3) percent, but may typically be as great as about twenty (20) percent. However, the bodies may be calcined after formation, or simply used as cast or otherwise formed.

The target tiles 20 typically have a relatively high thermal conductivity to further minimize thermal shock damage, the target tiles 20 are typically characterized with a very homogeneous microstructure.

The hexagonal tile bodies 20 are typically formed to shape using a formation technique that lends itself to bodies characterized by high homogeneity and low likelihood of lamination defects, such as slip casting, vibration casting, self-flow casting and the like. The tiles 20 may be sintered, or may be calcined after formation, or may be provided as-cast. In one embodiment, the tiles 20 are cast from a colloid-based precursor having the composition

| Chemistry | WT % |
|---|---|
| $Al_2O_3$ | 0.25 |
| $SiO_2$ | 0.06 |
| CaO | 0.13 |
| $Fe_2O_3$ | 0.06 |
| $TiO_2$ | 0.20 |
| $Zr_2O$ | 85.52 |
| Yttria | 13.78 |
| Total | 100.00 |
| $Zr_2O + Y_2O_3$ | 99.31 |

In use, the hexagonal tile bodies 20 are positioned adjacent one another in a SR/ATR unit 30 over a bed 35 of catalyst 25, more typically between the combustion chamber 37 and the catalyst media bed 35, wherein the bed 35 may be thought of as including catalyst media 25 and a network of air passages 43 infiltrating the same. Likewise, the plurality of inert target tiles 20 may be considered a cover bed or target surface 50 defining a network of air passages 51 connecting to the catalyst bed passages 43 in fluidic communication. The media bodies 25 are typically of a single size, but alternately may be provided in a blend of sizes, or in layers. The tiles 20 are typically positioned adjacent one another to define a contiguous target tile surface 50. The tiles 20 may have overlapping and/or interlocking lips or edges, such that movement of individual tiles 20 in response to degradation, dislodgement, erosion, or the like of the underlying media 25 is minimized. The large base size and high density of the YSZ tiles 20 provides increased stability against unintended repositioning, such as may occur if the bed media 25 erode and degrade under the tiles 20, if the tiles 20 experience turbulent flow of gasses thereover, during reverse flow (upflow) of the gasses thereover, and the like.

Example 1

A plurality of large refractory catalyst media bodies 25 is fabricated and positioned in a SR/ATR 30 to define a bed 35. The composition of the bodies 25 is high alumina/calcium aluminate impregnated with nickel catalyst. A plurality of hexagonal tiles 25 is positioned over the bed 35 to define a contiguous floor. Each respective tile 25 was forty-two (42) cm across and eighty-nine (89) mm thick, and was composed of fully stabilized 13% yttria YSZ. Each tile was perforated with about forty-six (46) evenly spaced 19 mm apertures.

Example 2

A plurality of spherical catalyst media bodies 25 is fabricated and positioned in a SR/ATR 30 to define a bed 35. Hexagonal tiles 20 were positioned over the bed 35 to define a contiguous floor. Each respective tile 20 is forty-two (42) cm across and eighty-nine (89) mm thick, and was composed of fully stabilized YSZ. Some tiles 20 remain unperforated, and other tiles 20 are honeycombed with up to about forty-six (46) evenly spaced 19 mm apertures, with some tiles 25 being only partially perforated.

Example 3

A plurality of catalyst media bodies 25 are fabricated and positioned in a SR/ATR 30 to define a bed 35. The composition of the bodies 25 is high alumina, coated with catalyst metal.

A plurality of hexagonal tiles 20 is positioned over the bed 35 to define a contiguous floor. Each respective tile 20 was forty-two (42) cm across and eighty-nine (89) mm thick, and was composed of partially stabilized YSZ. Each tile was perforated with about forty-six (46) evenly spaced 19 mm apertures and is composed of stabilized YSZ, with yttria being between 12% and 16% of the composition.

Example 4

A large plurality of spherical refractory media bodies 20 were fabricated having diameters of fifty (50) millimeters, and positioned in a reformation unit 30 to define a bed 35. A plurality of hexagonal tiles 20 is positioned over the bed 35 to define a contiguous floor. Each respective tile 20 is forty-two (42) cm across and eighty-nine (89) mm thick. Each tile was perforated with about forty-six (46) evenly spaced 19 mm apertures. The composition of the tiles 20 is fully stabilized YSZ, with about 14% yttria, with the balance being zirconia with trace amounts of other metal oxides.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

I claim:

1. A generally hexagonal ceramic tile body, comprising:
    a flat hexagonal top surface;
    an oppositely disposed flat hexagonal bottom surface oriented parallel with the flat hexagonal top surface;
    a refractory material defining a refractory inner volume disposed between the top and bottom surfaces; and
    a plurality of apertures extending therethrough;
    wherein the refractory inner volume is between about 80 mm and 95 mm thick;
    wherein the flat hexagonal top surface is about 42 cm across; and
    wherein the refractory inner volume is fully stabilized yttria stabilized zirconia;
    and wherein the refractory inner volume contains between 8 percent and 16 percent yttria.

2. The sintered body of claim 1 wherein the body has a porosity of less than 1 percent.

3. The sintered body of claim 1 wherein the body has a porosity of less than 10 percent.

4. The sintered body of claim 1 wherein the body has a porosity of less than 20 percent.

5. The sintered body of claim 1 wherein the refractory inner volume is 13% yttria.

6. The sintered body of claim 1 wherein each respective aperture is a right circular cylinder with a diameter of about 19 mm.

7. The sintered body of claim 1 and further comprising a lip extending from the tile body for engaging adjacent tile bodies.

8. A corrosion resistant refractory ceramic hexagonal target tile body for use covering a burner media bed, comprising a generally flat hexagonal portion and a plurality of generally right circular cylindrical aperture portions extending therethrough; wherein the ceramic hexagonal target tile body has a thickness of about 89 mm and a width of about 42 cm; wherein the ceramic body is 13 percent yttria fully stabilized YSZ; wherein each respective aperture has a diameter of about 19 mm.

9. A method of retarding corrosion of burner catalyst media, comprising:
    a) positioning a plurality of catalyst media in a regenerative unit to define a bed;
    b) positioning a plurality of hexagonal target tiles adjacent the bed and between a hot gas source and the bed to define a contiguous floor;
    c) flowing hot gas through the contiguous floor and through the bed;
    wherein each respective hexagonal target tile has a thickness of about 89 mm, a width of about 42 cm, and a composition of 13 percent Atria fully stabilized YSZ.

10. The method of claim 9 wherein each respective target tile further comprises a plurality of right circular cylindrical apertures extending therethrough; wherein each aperture has a diameter of about 19 mm.

\* \* \* \* \*